United States Patent
Staubach et al.

(10) Patent No.: US 11,912,423 B2
(45) Date of Patent: Feb. 27, 2024

(54) HYDROGEN STEAM AND INTER-COOLED TURBINE ENGINE

(71) Applicant: RTX Corporation, Farmington, CT (US)

(72) Inventors: Joseph B. Staubach, Colchester, CT (US); Amanda Jean Learned Boucher, Cambridge, MA (US); David Lei Ma, Avon, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/714,736

(22) Filed: Apr. 6, 2022

(65) Prior Publication Data

US 2023/0322396 A1    Oct. 12, 2023

(51) Int. Cl.
| | |
|---|---|
| F02C 6/20 | (2006.01) |
| B64D 27/12 | (2006.01) |
| B64D 27/24 | (2006.01) |
| F02C 7/18 | (2006.01) |

(52) U.S. Cl.
CPC ............. *B64D 27/24* (2013.01); *B64D 27/12* (2013.01); *F02C 6/20* (2013.01); *F02C 7/18* (2013.01); *F05D 2220/323* (2013.01); *F05D 2220/72* (2013.01); *F05D 2260/20* (2013.01)

(58) Field of Classification Search
CPC .... F02C 7/224; F02C 3/22; F02C 7/36; F02C 7/12; F02C 3/30; F02C 6/20; F02C 7/18; F01D 25/32; F02K 25/06; F01K 23/106; B64D 27/24; B64D 27/12; F05D 2220/323; F05D 2220/72; F05D 2260/20
See application file for complete search history.

(56) References Cited

U.S. PATENT DOCUMENTS

| 7,117,663 B2 | 10/2006 | Knapp |
| 7,178,339 B2 | 2/2007 | Goldmeer et al. |
| 7,555,893 B2 | 7/2009 | Okai et al. |
| | (Continued) | |

FOREIGN PATENT DOCUMENTS

EP    3048281 A1    7/2016

OTHER PUBLICATIONS

European Search Report for European Application No. 23166985.4; dated Sep. 1, 2023, 7 pages.

*Primary Examiner* — Todd E Manahan
*Assistant Examiner* — Rodolphe Andre Chabreyrie
(74) *Attorney, Agent, or Firm* — CANTOR COLBURN LLP

(57) ABSTRACT

Propulsion systems for aircraft include a fan and a low pressure turbine operably coupled to a first shaft, a low pressure compressor and an intermediate pressure turbine operably coupled to a second shaft, and a high pressure compressor and a high pressure turbine operably coupled to a third shaft. A burner is arranged between the high pressure compressor and the high pressure turbine, with a main flow path defined through the propulsion system. A hydrogen fuel system is configured to supply hydrogen fuel to the burner. A condenser is arranged along the main flow path and configured to extract water from exhaust from the burner. An evaporator is arranged along the main flow path and configured to receive a portion of the water to generate steam which is injected into the main flow path upstream from the evaporator.

20 Claims, 2 Drawing Sheets

(56) References Cited

U.S. PATENT DOCUMENTS

| | | | |
|---|---|---|---|
| 2017/0268423 A1* | 9/2017 | Schwarz | B64D 15/04 |
| 2020/0088098 A1* | 3/2020 | Roberge | F02C 7/143 |
| 2021/0207500 A1* | 7/2021 | Klingels | F01K 23/10 |
| 2021/0262383 A1* | 8/2021 | Uechi | F02C 6/18 |
| 2022/0297844 A1* | 9/2022 | Mackin | B64D 27/24 |

* cited by examiner

HYDROGEN STEAM AND INTER-COOLED TURBINE ENGINE

TECHNICAL FIELD

The subject matter disclosed herein generally relates to aircraft propulsion systems and, more particularly, to hydrogen powered engines and hydrogen steam and inter-cooled turbine engines for aircraft.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section drives the compressor section to rotate. In some configurations, a fan is also connected to the shaft and is driven to rotate via rotation of the turbine.

Typically, liquid fuel is employed for combustion onboard an aircraft, in the gas turbine engine. The liquid fuel has conventionally been a hydrocarbon-based fuel. Alternative fuels have been considered, but suffer from various challenges for implementation, particularly on aircraft. Hydrogen-based and/or methane-based fuels are viable effective alternatives which may not generate the same combustion byproducts as conventional hydrocarbon-based fuels. The use of hydrogen and/or methane, as a gas turbine fuel source, may require very high efficiency propulsion, in order to keep the volume of the fuel low enough to feasibly carry on an aircraft. That is, because of the added weight associated with such liquid/compressed/supercritical fuels, such as related to vessels/containers and the amount (volume) of fuel required, improved efficiencies associated with operation of the gas turbine engine may be necessary.

SUMMARY

According to some embodiments, propulsion systems for aircraft are provided. The propulsion systems include a first shaft, a second shaft, and a third shaft. A fan and a low pressure turbine are operably coupled to the first shaft. A low pressure compressor and an intermediate pressure turbine are operably coupled to the second shaft. A high pressure compressor and a high pressure turbine are operably coupled to the third shaft. A burner is arranged between the high pressure compressor and the high pressure turbine, wherein a main flow path is defined through the fan, the low pressure compressor, the high pressure compressor, the burner, the high pressure turbine, the intermediate pressure turbine, and the low pressure turbine. A hydrogen fuel system is configured to supply hydrogen fuel from a liquid hydrogen tank to the burner through a hydrogen flow path. A condenser is arranged along the main flow path and configured to extract water from exhaust from the burner and supply said extracted water to a water storage tank. An evaporator is arranged along the main flow path and configured to receive a portion of the water from the water storage tank to generate steam, wherein said steam is injected into the main flow path upstream from the evaporator.

In addition to one or more of the features described herein, or as an alternative, further embodiments of the propulsion systems may include that the steam is injected into the main flow path at an injection point at the burner.

In addition to one or more of the features described herein, or as an alternative, further embodiments of the propulsion systems may include that the steam is injected into the main flow path at an injection point upstream of the burner.

In addition to one or more of the features described herein, or as an alternative, further embodiments of the propulsion systems may include a steam turbine arranged between the evaporator and a steam injection point, wherein the steam turbine is configured to expand the steam and lower a pressure thereof prior to injection of said steam into the main flow path at the steam injection point.

In addition to one or more of the features described herein, or as an alternative, further embodiments of the propulsion systems may include that water from the water storage tank is injected into the main flow path at one or more water injection points.

In addition to one or more of the features described herein, or as an alternative, further embodiments of the propulsion systems may include an electric motor/generator operably coupled to the first shaft, the electric motor/generator configured to at least one of input power to the first shaft and extract power from the first shaft.

In addition to one or more of the features described herein, or as an alternative, further embodiments of the propulsion systems may include a fuel cell arranged along the hydrogen flow path and configured to receive a portion of the hydrogen.

In addition to one or more of the features described herein, or as an alternative, further embodiments of the propulsion systems may include that a portion of the water from the water storage tank is supplied to the fuel cell.

In addition to one or more of the features described herein, or as an alternative, further embodiments of the propulsion systems may include one or more hydrogen loads arranged along the hydrogen flow path, wherein the hydrogen is configured to pick up heat from the one or more hydrogen loads prior to injection into the burner.

In addition to one or more of the features described herein, or as an alternative, further embodiments of the propulsion systems may include that the one or more hydrogen loads comprises at least one of super conducting electrics, a working fluid of an environmental control system of the aircraft, an air conditioning heat exchanger, and an engine working fluid heat exchanger.

In addition to one or more of the features described herein, or as an alternative, further embodiments of the propulsion systems may include a hydrogen expansion turbine arranged along the hydrogen flow path and configured to expand the hydrogen prior to injection into the burner.

In addition to one or more of the features described herein, or as an alternative, further embodiments of the propulsion systems may include that ram air is passed through the condenser to provide a cold sink to extract of water from the exhaust of the burner.

In addition to one or more of the features described herein, or as an alternative, further embodiments of the propulsion systems may include at least one water pump configured to boost a pressure of water extracted from the water storage tank.

According to some embodiments, aircraft are provided. The aircraft include a fuselage and a propulsion system mounted to the fuselage. The propulsion system includes a first shaft, a second shaft, and a third shaft. A fan and a low pressure turbine are operably coupled to the first shaft. A low pressure compressor and an intermediate pressure turbine are operably coupled to the second shaft. A high pressure compressor and a high pressure turbine are operably coupled to the third shaft. A burner is arranged between the high pressure compressor and the high pressure turbine, wherein a main flow path is defined through the fan, the low pressure compressor, the high pressure compressor, the burner, the high pressure turbine, the intermediate pressure turbine, and the low pressure turbine. A hydrogen fuel system is configured to supply hydrogen fuel from a liquid hydrogen tank to the burner through a hydrogen flow path. A condenser is arranged along the main flow path and configured to extract water from exhaust from the burner and supply said extracted water to a water storage tank. An evaporator is arranged along the main flow path and configured to receive a portion of the water from the water storage tank to generate steam, wherein said steam is injected into the main flow path upstream from the evaporator.

In addition to one or more of the features described herein, or as an alternative, further embodiments of the aircraft may include a steam turbine arranged between the evaporator and a steam injection point, wherein the steam turbine is configured to expand the steam and lower a pressure thereof prior to injection of said steam into the main flow path at the steam injection point.

In addition to one or more of the features described herein, or as an alternative, further embodiments of the aircraft may include an electric motor/generator operably coupled to the first shaft, the electric motor/generator configured to at least one of input power to the first shaft and extract power from the first shaft.

In addition to one or more of the features described herein, or as an alternative, further embodiments of the aircraft may include a fuel cell arranged along the hydrogen flow path and configured to receive a portion of the hydrogen.

In addition to one or more of the features described herein, or as an alternative, further embodiments of the aircraft may include one or more hydrogen loads arranged along the hydrogen flow path, wherein the hydrogen is configured to pick up heat from the one or more hydrogen loads prior to injection into the burner.

In addition to one or more of the features described herein, or as an alternative, further embodiments of the aircraft may include a hydrogen expansion turbine arranged along the hydrogen flow path and configured to expand the hydrogen prior to injection into the burner.

In addition to one or more of the features described herein, or as an alternative, further embodiments of the aircraft may include that ram air is passed through the condenser to provide a cold sink to extract water from the exhaust of the burner.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
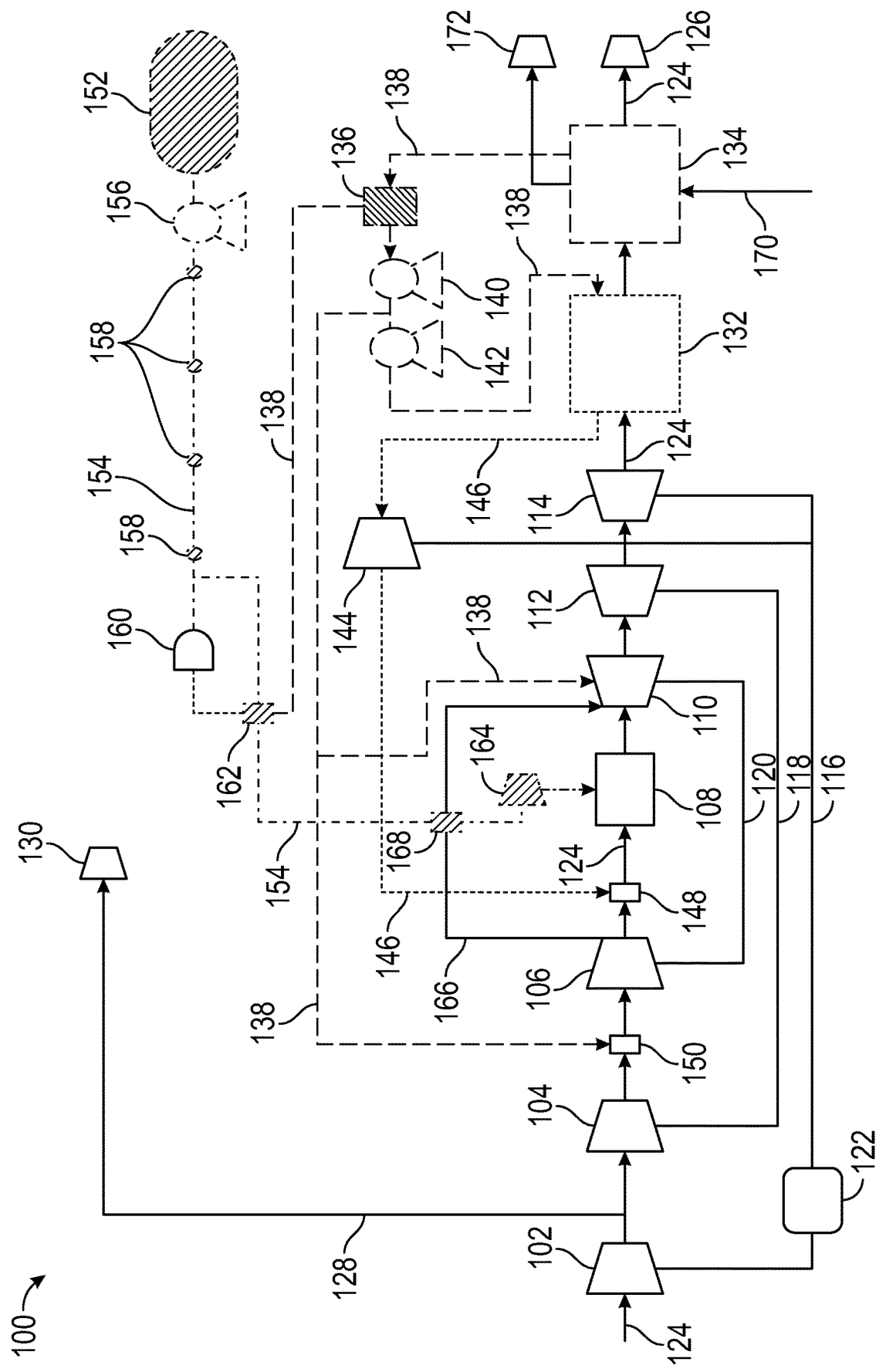
FIG. 1 is a schematic illustration of an engine configuration in accordance with an embodiment of the present disclosure.

Hydrogen, steam, and inter-cooled turbine engines for aircraft are described. Such engines can provide economical zero or near zero carbon emission propulsion systems for aircraft. The size and weight of $LH_2$ fuel tanks require heavier airframes and extended fuselages that can result in a 15% to 25% mission energy cost penalty. The engines and configurations described herein and in accordance with embodiments of the present disclosure may deliver 15% to 50% (for example) aircraft mission energy reduction by exploiting the unique properties of Liquid Hydrogen ($LH_2$). This improved engine performance can reduce the amount of fuel (e.g., $LH_2$) carried on board an aircraft and offset volumetric aircraft penalties associated with carrying $LH_2$ storage and associated components. As such, the disclosed engine concepts can offset the weight and volumetric penalties typically associated with carrying $LH_2$ onboard aircraft.

In accordance with non-limiting embodiments of the disclosed engine configurations, an engine may be configured to burn $H_2$ in an air breathing gas turbine cycle modified with a semi-closed loop steam injection cycle. Exhaust heat is recovered into steam by evaporating high pressure water through an engine exhaust heat exchanger. The steam is then injected into the combustor to improve performance by increasing turbine mass flow and power output without burdening the main air compressors or at least reducing a burden on such compressors. The thermal efficiency is increased because the work required to pump liquid water is much less than the work to compress an equivalent air flow through the compressor. The source water for the evaporator may be provided by an exhaust condenser placed downstream of the evaporator. The cold sink for the condenser may be, for example, ram or fan air depending on the application and/or engine configuration. This cycle may include up to (or more than) 35% steam-air-ratios (SAR) and may be assisted by a multiple fold (e.g., 2×, 3×, etc.) increase in moisture from burning $H_2$ as compared to jet A fuel.

The steam injection of embodiments of the disclosed engine systems can include a Cheng cycle. Cheng cycles are used in some industrial applications to improve efficiency and to reduce NOx emissions by minimizing hot spots in the combustor. Until now, Cheng cycles have not been considered for aircraft propulsion in part because of weight considerations. For example, condensers of Cheng cycle systems used to recover water from the exhaust may be excessively heavy and thus are not viable for aircraft/flight applications.

Embodiments of the disclosed engines and systems can reduce the size of evaporators and condensers of such systems by increasing engine specific power multiple fold (e.g., 2×, 3×, etc.) to reduce the flow through the heat exchangers. This may be provided by one or more of the following. Firstly, $H_2$ products of combustion have higher specific heat and lower molecular weight, as compared to other fuels, and allows the turbines to make more power for a given amount of compression work. Secondly, by injecting a portion of recovered water (e.g., steam) into a compression system intercooling of the engine may be achieved. Thirdly, pumping the condensed water to high pressures (e.g., >150 bar) and expanding it through a steam turbine connected to a fan shaft before being injected into the burner can improve operation and/or efficiency. Fourth, by recovering aircraft and engine cooling heat into the $LH_2$ fuel can be for useful power generation. Such cooling systems (and heat pick-up by the $LH_2$) may include aircraft environmental and electric systems, engine oil, and engine-cooled, cooling air. Finally, using hybrid electrics can allow growth with $H_2$ fuel cells and super conducting electrics.

The net result is that the engine air flow can be reduced multiple fold (e.g., 2×, 3×, etc.) and commensurately reduce the evaporator and condenser weight/volume multiple fold (e.g., 2×, 3×, etc.). Through an assessment of implementation of an engine configured in accordance with the present disclosure including improved engine efficiency, increased weight, and ram drag associated with the condenser, benefits thereof may be illustrated. For example, through injection of steam into a combustor, reduced weight and volume of condensers and evaporators, optional use of a turbo expander, and using the hydrogen fuel as a cooling source, mission energy consumption may be reduced, in some embodiments, between 5% and 30%. Further, through use of cryogenic components (e.g., motors, generators, power conditioners, etc.) an additional energy reduction of, for example, 10-20% may be realized. Additional integrated aircraft designs and topological investigation and configuration may achieve additional reductions in fuel consumption, resulting in a potential total mission energy reduction of up to 60% or more.

An aspect of the disclosed engine configurations is to include steam that can be added to a $H_2$ combustor while maintaining stable combustion. Levels as low as 5% Steam-Air-Ratio (SAR) can cause an increase in CO, an early indicator of flame instability. The inventors have discovered that configurations disclosed herein and in accordance with embodiments of the present disclosure show unexpectedly high performance when the SAR is in the range of 20%-40%. Features of the disclosed engine configurations in accordance with the present disclosure can include, without limitation, $H_2$ innate flame stability exploited to increase operation to 25%-35% SAR, the use of $H_2$ to reduce NOx at high SAR levels, and the ability for steam to improve burner life by alleviating $H_2$ flame attachment.

In accordance with some embodiments of the present disclosure, a condenser may achieve up to 35% or more water recovery from engine exhaust (e.g., downstream flow of a hydrogen burning combustor).

Turning now to FIG. 1, a schematic representation of a turbine engine 100 in accordance with an embodiment of the disclosure is shown. The engine 100 includes a fan 102, a low pressure compressor (LPC) 104, a high pressure compressor (HPC) 106, a burner or combustor section 108, a high pressure turbine (HPT) 110, an intermediate pressure turbine (IPT) 112, and a low pressure turbine (LPT) 114. The components of the engine 100, in this embodiment, are arranged on multiple shafts, which are schematically shown. For example, a first shaft 116 operably connects the fan 102 and the low pressure turbine 114, a second shaft 118 operably connects the low pressure compressor 104 and the intermediate pressure turbine 112, and a third shaft 120 operably connects the high pressure compressor 106 and the high pressure turbine 110. Although this illustrative configuration includes three shafts, those of skill in the art will appreciate that engine configurations in accordance with the present disclosure may include more or fewer shafts. In some configurations, gearing and/or clutches may be included along the shafts to allow multiple components to be coupled to the same shaft while ensuring desired rotational rates for the specific component, as will be appreciated by those of skill in the art.

As shown, an electric motor 122 may be operably coupled to the first shaft 116. The electric motor 122 may be configured to impart and/or extract power from the first shaft 116. That is, in some embodiments, the electric motor 122 may be configured to provide power assist to the first shaft 116. In some embodiments, the electric motor 122 may be configured to have a rotor thereof rotationally driven to generate electrical power, which can be used within the engine 100 and/or directed to other electrical and/or electronic components of an aircraft.

A main flow path 124 defines a flow of gases (e.g., air breathing engine) directed through the fan 102 (e.g., an engine inlet), the LPC 104, the HPC 106, the burner 108, the HPT 110, the IPT 112, and the LPT 114 and is ejected or exits out a core nozzle 126. A bypass flow path 128 may flow through the fan 102 and then will bypass the remaining components of the turbine engine 100, and exit through a fan nozzle 130, as known in the art.

In this illustrative embodiment, downstream of the LPT 114, along the main flow path 124, and upstream of the core nozzle 126 are an evaporator 132 and a condenser 134. The evaporator 132 and the condenser 134 are arranged to operate as heat exchangers proximate the core nozzle 126 to recover waste heat from an exhaust of the burner 108. That is, the evaporator 132 and the condenser 134 are arranged along the main flow path 124 and positioned and arranged to thermally interact with the gases of such main flow path 124 downstream from the burner 108 where the gases of the main flow path 124 are heated. As such, thermal recovery may be achieved through the evaporator 132 and the condenser 134. The evaporator 132 and the condenser 134 may be part of a water or steam cycle that is incorporated into operation of the engine 100, and as described herein.

For example, steam may be generated within the evaporator 132, with water supplied from an onboard water storage tank 136 through a water flow path 138. The water may be passed through one or more pumps 140, 142 arranged between the water storage tank 136 and the evaporator 132. When the water enters the evaporator 132 the water will be vaporized to generate the steam.

The steam may be passed from the evaporator 132 to a steam turbine 144 along a steam flow path 146. The steam turbine 144 is configured to expand the steam, thus lowering the pressure thereof. The water may be boosted in pressure by a low pressure pump 140 and a high pressure pump 142 prior passing through the steam turbine 144. The expanded steam may then be injected into the main flow path 124 upstream of the burner/combustor section 108 at a steam injection point 148. Although illustratively shown with the steam injection point 148 being upstream of the combustor 108, in some configurations, the steam may be injected directly into the combustor 108. Further, other, or additional steam injection points may be employed without departing from the scope of the present disclosure. The steam may be injected into the combustor 108 to improve performance by increasing turbine mass flow of the turbines 110, 112, 114 and power output by reducing or eliminating the burden on the main air compressors 104, 106. In some configurations, the steam turbine 144 may be connected to the first (fan)

shaft 116 of the turbine engine 100, as illustratively shown, or may be configured to provide power to the pumps 140, 142.

In some embodiments, and as shown, liquid water (e.g., droplets or the like) may also be supplied from the water storage tank 136 and injected into the main flow path 124 upstream of the combustor 108 at a water injection point 150. For example, the water injection point 150 may be at a position between the LPC 104 and the HPC 106, although other or additional water injection points may be employed without departing from the scope of the present disclosure. This water may be in vapor, droplet, or liquid form, and may be used for intercooling the engine 100 and the components thereof. A portion of water may also be injected downstream of the combustor 108, such as at the HPT 110, as illustratively shown, to provide optional supplemental or water-augmented cooling to the HPT 110. Similar water injection may be used at the other turbine sections 112, 114 individually or in combination.

In this configuration, the engine 100 is configured to burn hydrogen as a fuel. As such, the engine 100 includes a hydrogen fuel source system. Liquid hydrogen may be stored onboard an aircraft in a Liquid Hydrogen Tank 152 (generally referred to as a hydrogen tank 152). The hydrogen from the hydrogen tank 152 may be passed along a hydrogen flow path 154 to the combustor 108 for combustion of the hydrogen. A hydrogen pump 156 may be arranged along the hydrogen flow path 154 to pump the liquid hydrogen from the hydrogen tank 152 to the burner 108. Along hydrogen flow path 154 may be one or more additional pumps and various heat exchangers generally referred to as hydrogen loads 158. Such hydrogen loads 158 may include, for example and without limitation, super conducting electrics, a working fluid of an environmental control system of the aircraft, an air conditioning heat exchanger, and engine working fluid heat exchangers (e.g., oil, air, etc.). These hydrogen loads 158 are configured to use the liquid hydrogen as a heat sink, allowing for cooling of various systems onboard the aircraft. As the hydrogen picks up heat from this hydrogen loads 158, the hydrogen will be increased in temperature prior to injection into the combustor 108.

In this illustrative embodiment, an optional fuel cell 160 is arranged along the hydrogen flow path 154. A portion of the hydrogen may be supplied to the fuel cell 160 to generate power at the fuel cell 160. In some non-limiting embodiments, the fuel cell 160 may be a solid oxide fuel cell. As such, the hydrogen from the hydrogen flow path 154 and the oxygen within the fuel cell 160 may be catalyzed to generate electrical power. In some embodiments, and as shown, the fuel cell 160 may be configured to receive water (or steam) from the water storage tank 136. If steam is employed, an evaporator 162 may be arranged along the hydrogen flow path 154, and the heated hydrogen (from the hydrogen loads 158) may be sufficient to convert the water into steam prior to use in the fuel cell 160.

In some configurations, the hydrogen may be a supercritical fluid when it is supplied to the burner 108. In some configurations, the liquid hydrogen supplied from the tank 152 may be pumped from liquid form to a supercritical state by the pump 156. Heat may be added to the supercritical fluid through various mechanisms, such as the hydrogen loads 158, the evaporator 162, and/or heat exchangers. This heated supercritical fluid may be expanded prior to injection into the burner 108. For example, the supercritical hydrogen may be reduced in pressure through a hydrogen expansion turbine 164 to ensure the hydrogen enters the burner 108 at a pressure that is close to burner pressure (e.g., as a supercritical fluid or gas). Additionally, to cause the transition from liquid to gas, of the hydrogen, in some embodiments, a portion of the air from the main flow path 124 may be pulled from the HPC 106 along a main flow bypass 166 to bypass the burner 108 and then be reinjected into the main flow path 124 at the HPT 110. The air along the main flow bypass 166 may be passed through a heat exchanger 168 to heat the liquid hydrogen prior to injection into the burner 108. In some embodiments, and as shown, the main flow bypass-hydrogen flow heat exchanger 168 may be arranged upstream of the hydrogen expansion turbine 164, although in other embodiments such heat exchanger 168 may be arranged downstream of the hydrogen expansion turbine 164. The expansion turbine 164 can provide power to other components of the system, such as the pump 156, or the hydrogen expansion turbine 164 may be connected to a shaft of the system (e.g., first shaft 116).

As discussed above, the engine 100 includes a condenser 134 arranged downstream from the LPT 114 along the main flow path 124. The condenser 134 may receive external or ambient air along a ram air flow path 170 that is received from a ram scoop or the like on the engine 100, as will be appreciated by those of skill in the art. The ram air may be passed through the condenser 134 to provide cooling to the exhaust of the combustor 108 along the main gas path 124 and then the ram air may be ejected overboard through a ram nozzle 172. As such, moisture within the flow of the main gas path 124 may be condensed and recycled back to the water storage tank 136.

Figure 2:
FIG. 2 is a schematic illustration of an aircraft that has engines mounted thereto in accordance with an embodiment of the present disclosure.

Referring now to FIG. 2, a schematic illustration of an aircraft 200 that can incorporate embodiments of the present disclosure is shown. The aircraft 200 has a fuselage 202 and one or more engines 204 affixed to the fuselage 202. The engines 204 may be configure as the engine 100 shown in FIG. 1. Although shown with the engines 304 being wing-mounted, those of skill in the art will appreciate that other locations for the engines may be possible without departing from the scope of the present disclosure (e.g., tail mounted).

Advantageously, embodiments described herein provide aircraft engines having improved operability and efficiencies. Such engines may be configured to burn hydrogen as a fuel while maintaining relatively low weight and/or volume in order to capitalize upon the non-carbon based fuels. The engines include various features that can improve efficiencies of such engines, including, but not limited to steam injection, thermal treatment of hydrogen fuel, water injection, power generation through motors coupled to shafts, power generation through use of a fuel cell, and the like, as described above.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. A propulsion system for an aircraft, the propulsion system comprising:
    a first shaft, a second shaft, and a third shaft;
    a fan and a low pressure turbine operably coupled to the first shaft;
    a low pressure compressor and an intermediate pressure turbine operably coupled to the second shaft;
    a high pressure compressor and a high pressure turbine operably coupled to the third shaft;
    a burner arranged between the high pressure compressor and the high pressure turbine, wherein a main flow path is defined through the fan, the low pressure compressor, the high pressure compressor, the burner, the high pressure turbine, the intermediate pressure turbine, and the low pressure turbine;
    a hydrogen fuel system configured to supply hydrogen fuel from a liquid hydrogen tank to the burner through a hydrogen flow path;
    a main flow bypass arranged to direct a portion of air from the high pressure compressor to bypass the burner and be directed to the high pressure turbine, wherein a heat exchanger is arranged along the main flow bypass to receive the portion of air as a first fluid and the hydrogen as a second fluid, wherein the hydrogen is heated within the heat exchanger prior to being supplied into the burner;
    a condenser arranged along the main flow path and configured to extract water from exhaust from the burner and supply said extracted water to a water storage tank; and
    an evaporator arranged upstream from the condenser along the main flow path and configured to receive a portion of the water from the water storage tank to generate steam, wherein said steam is injected into the main flow path upstream from the evaporator.

2. The system of claim 1, wherein the steam is injected into the main flow path at an injection point at the burner.

3. The system of claim 1, wherein the steam is injected into the main flow path at an injection point upstream of the burner.

4. The system of claim 1, further comprising a steam turbine arranged between the evaporator and a steam injection point, wherein the steam turbine is configured to expand the steam and lower a pressure thereof prior to injection of said steam into the main flow path at the steam injection point.

5. The system of claim 1, wherein water from the water storage tank is injected into the main flow path at one or more water injection points.

6. The system of claim 1, further comprising an electric motor/generator operably coupled to the first shaft, the electric motor/generator configured to at least one of input power to the first shaft and extract power from the first shaft.

7. The system of claim 1, further comprising a fuel cell arranged along the hydrogen flow path and configured to receive a portion of the hydrogen.

8. The system of claim 7, wherein a portion of the water from the water storage tank is supplied to the fuel cell.

9. The system of claim 1, further comprising one or more hydrogen loads arranged along the hydrogen flow path, wherein the hydrogen is configured to pick up heat from the one or more hydrogen loads prior to injection into the burner.

10. The system of claim 9, wherein the one or more hydrogen loads comprises at least one of super conducting electrics, a working fluid of an environmental control system of the aircraft, an air conditioning heat exchanger, and an engine working fluid heat exchanger.

11. The system of claim 1, further comprising a hydrogen expansion turbine arranged along the hydrogen flow path and configured to expand the hydrogen prior to injection into the burner.

12. The system of claim 1, wherein ram air is passed through the condenser to provide a cold sink to extract of water from the exhaust of the burner.

13. The system claim 1, further comprising at least one water pump configured to boost a pressure of water extracted from the water storage tank.

14. An aircraft comprising:
    a fuselage; and
    a propulsion system mounted to the fuselage, the propulsion system having:
    a first shaft, a second shaft, and a third shaft;
    a fan and a low pressure turbine operably coupled to the first shaft;
    a low pressure compressor and an intermediate pressure turbine operably coupled to the second shaft;
    a high pressure compressor and a high pressure turbine operably coupled to the third shaft;
    a burner arranged between the high pressure compressor and the high pressure turbine, wherein a main flow path is defined through the fan, the low pressure compressor, the high pressure compressor, the burner, the high pressure turbine, the intermediate pressure turbine, and the low pressure turbine;
    a hydrogen fuel system configured to supply hydrogen fuel from a liquid hydrogen tank to the burner through a hydrogen flow path;
    a main flow bypass arranged to direct a portion of air from the high pressure compressor to bypass the burner and be directed to the high pressure turbine, wherein a heat exchanger is arranged along the main flow bypass to receive the portion of air as a first fluid and the hydrogen as a second fluid, wherein the hydrogen is heated within the heat exchanger prior to being supplied into the burner;
    a condenser arranged along the main flow path and configured to extract water from exhaust from the burner and supply said extracted water to a water storage tank; and
    an evaporator arranged upstream from the condenser along the main flow path and configured to receive a portion of the water from the water storage tank to generate steam, wherein said steam is injected into the main flow path upstream from the evaporator.

15. The aircraft of claim 14, further comprising a steam turbine arranged between the evaporator and a steam injection point, wherein the steam turbine is configured to expand the steam and lower a pressure thereof prior to injection of said steam into the main flow path at the steam injection point.

16. The aircraft of claim 14, further comprising an electric motor/generator operably coupled to the first shaft, the electric motor/generator configured to at least one of input power to the first shaft and extract power from the first shaft.

17. The aircraft of claim 14, further comprising a fuel cell arranged along the hydrogen flow path and configured to receive a portion of the hydrogen.

18. The aircraft of claim 14, further comprising one or more hydrogen loads arranged along the hydrogen flow path, wherein the hydrogen is configured to pick up heat from the one or more hydrogen loads prior to injection into the burner.

19. The aircraft of claim 14, further comprising a hydrogen expansion turbine arranged along the hydrogen flow path and configured to expand the hydrogen prior to injection into the burner.

20. The aircraft of claim 14, wherein ram air is passed through the condenser to provide a cold sink to extract water from the exhaust of the burner.

* * * * *